June 24, 1930.  A. CRILL  1,768,120
HEAD GATE
Filed May 31, 1929  2 Sheets-Sheet 1

INVENTOR.
ALPHONSO CRILL
BY Irving L. McCathran
ATTORNEYS.

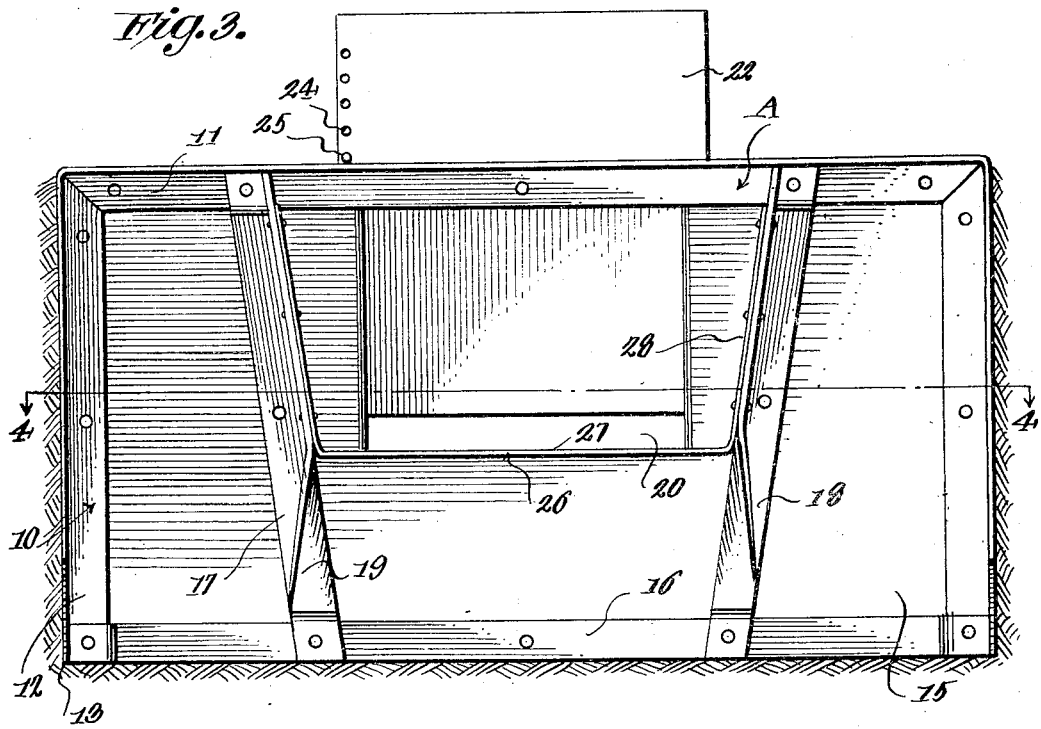
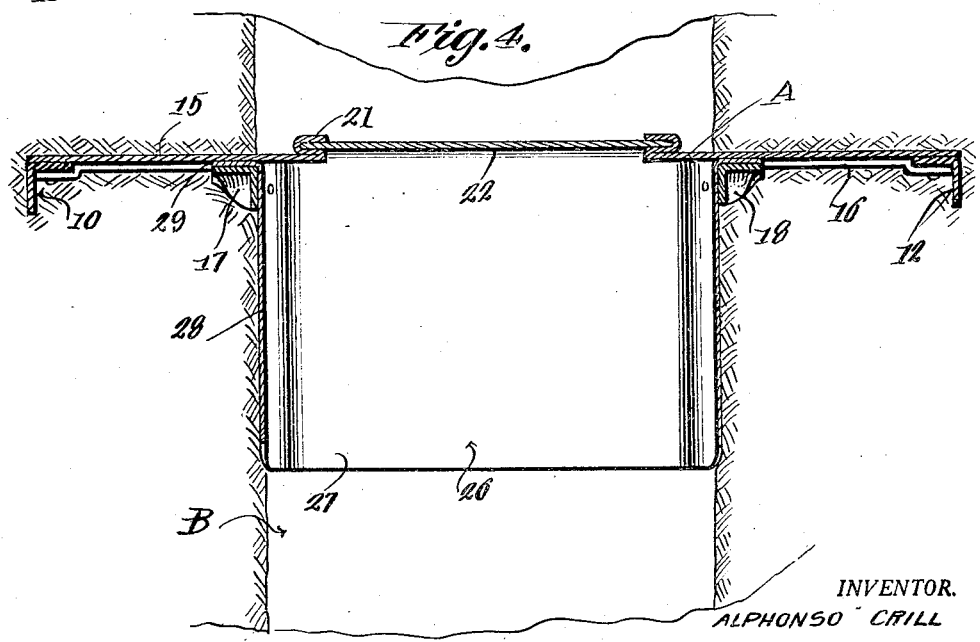

Patented June 24, 1930

1,768,120

UNITED STATES PATENT OFFICE

ALPHONSO CRILL, OF NAMPA, IDAHO

HEAD GATE

Application filed May 31, 1929. Serial No. 367,448.

This invention relates to water controlling devices for waterways and more particularly to a portable headgate for irrigation ditches.

One of the primary objects of my invention is to provide a portable headgate for irrigation ditches which can be easily placed in correct position across the ditch and which is so constructed as to have effective engagement with the bed and banks of the ditch.

A further object of my invention is the provision of a novel tail piece associated with the frame of the gate for preventing the washing out of the gate and the seeping of water underneath and around the sides of the gate.

A further object of my invention is the provision of an improved headgate for irrigation ditches embodying a supporting frame formed of angle iron with a sheet metal cover plate having the gate opening formed therein, with means formed on the plate for slidably receiving the controlling gate, the frame and plate permitting the convenient driving of the entire gate structure into the ditch.

A still further object of my invention is to provide an improved gate for irrigation ditches of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawing, in which drawing:

Figure 3 is a rear elevation of my gate showing the same associated with a ditch, and Figure 4 is a horizontal section through the gate taken on the line 4—4 of Figure 3 looking in the direction of the arrows.

Referring to the drawings in detail, whereas in similar reference characters designate corresponding parts throughout the several views, the letter A generally indicates my improved gate structure and B an irrigation ditch with which the same can be associated.

Figure 1:
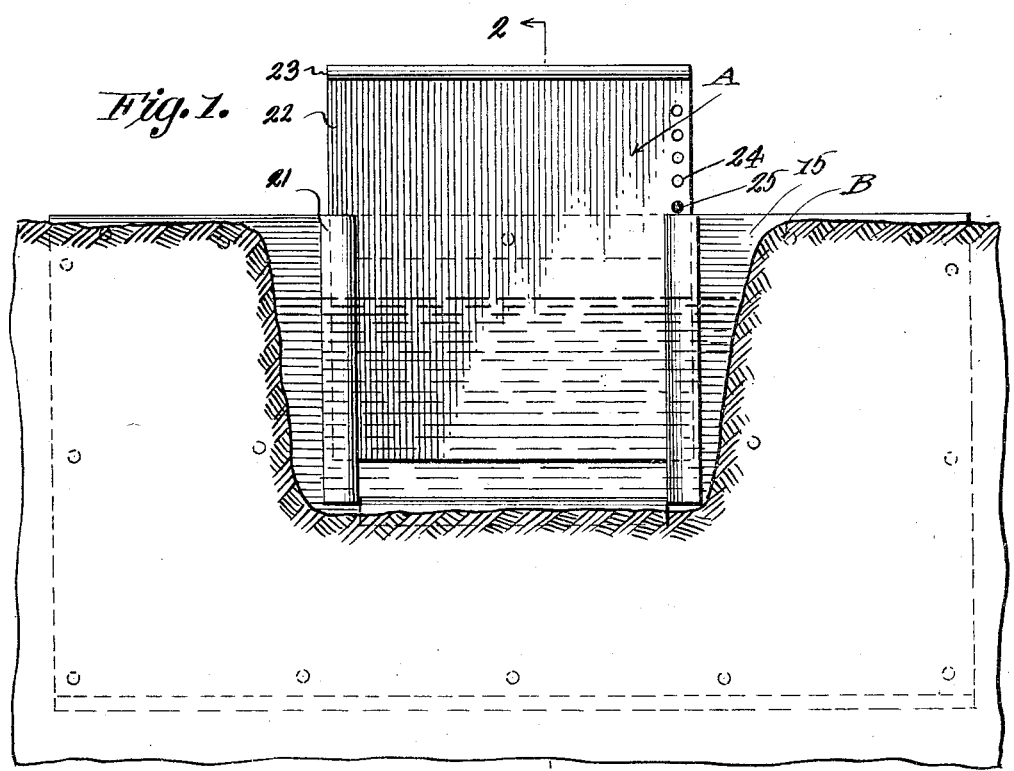
Figure 1 is a front elevation of my improved gate showing the same associated with an irrigation ditch.
Figure 2:
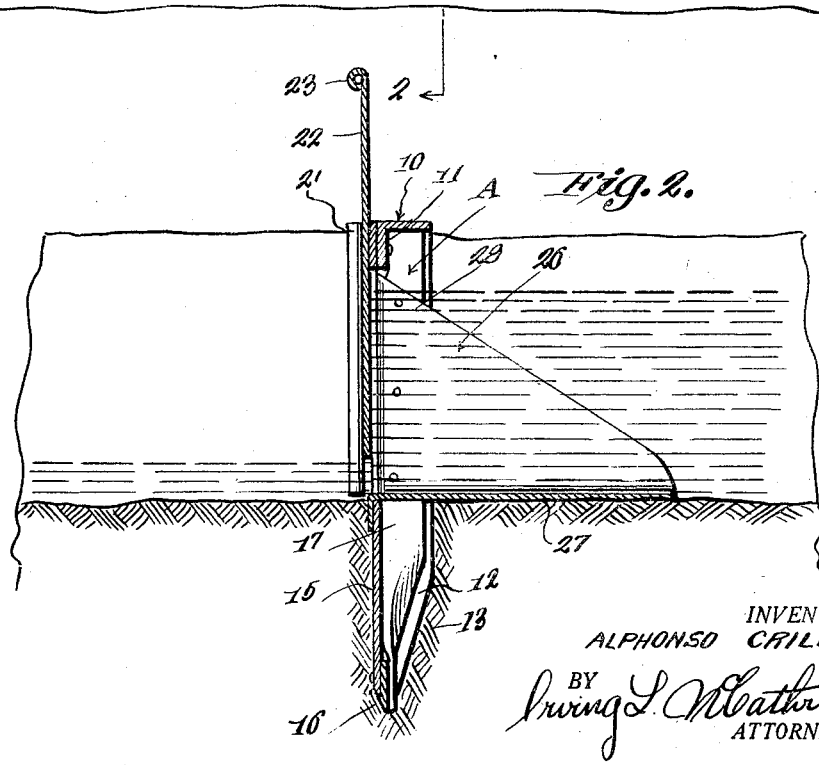
Figure 2 is a vertical section through the gate taken on the line 2—2 of Figure 1 looking in the direction of the arrows.

The improved irrigation ditch A comprises a frame 10 formed of angle iron and the angle iron frame is of a substantially inverted U shape and includes a top cross bar 11 and depending legs 12, the outer flanges of which can be beveled as at 13 to facilitate the driving of the gate structure in place in the ditch B.

This angle iron frame has bolted, riveted or otherwise secured thereto a sheet metal plate 15 which covers one face of the frame and extends to the lower ends of the legs 12. The lower edge of the plate 15 can have bolted, riveted or otherwise secured thereto a reinforcing strip of strap iron 16 which preferably extends slightly below the lower edge of the plate and if desired the lower edge of the plate and the strap iron 16 can be beveled to provide a sharp edge to also facilitate the driving of the structure in the ditch.

On opposite sides of the vertical transverse center of the plate, I provide inwardly inclined angle iron reinforcing bars 17 and 18 which have their opposite ends secured respectively to the top bar 11 of the inverted U shaped angle iron frame 10 and the strap iron 16 and if desired these bars 17 and 18 can also be secured to the plate 15. The outer flanges of the bars 17 and 18 are preferably bent inwardly into gradual abutting engagement with the inner flanges as at 19 in order to also permit the easy driving of the gate in proper position. The plate 15 is provided with the gate opening 20 and it is to be noted that the top bar 11 of the inverted frame 10 extends across said opening and that the opening terminates a considerable distance above the lower edge of the plate. The side edges of the gate opening 20 have formed thereon vertical guides 21 for slidably receiving the gate proper 22, which is also preferably formed from sheet metal and the upper edge of this gate proper can be rolled as at 23 to provide a suitable manipulating hand piece and to eliminate the forming of sharp cutting edges. One side of the plate is provided with a plurality of spaced openings 24 into any one of which can be placed a pin 25 for engaging the upper edge of the plate 15 to hold the gate in an adjusted raised position.

Attention is invited to the formation of the vertical guides 21 for the gate proper 22 and it is to be noted that these guides are formed directly on the plate 15 by bending back the metal as clearly shown in Figure 4 of the drawings. One of the important features of my invention is the provision of the substantially U shaped tail piece 26 which is supported by the bars 17 and 18. As shown, the tail piece 26 includes a bottom wall 27 and outwardly inclined side walls 28 and the side walls 28 can have their inner edges provided with right angularly disposed attaching flanges 29 which can be, if desired, placed between the bars 17 and 18 and held in place thereby. As shown in Figure 3 of the drawings this tail piece extends beyond the side walls of the gate opening 20 and the side walls of the tail piece engage the banks of the ditch B and the lower wall 27 engages the bed of the ditch B.

This tail piece is provided for preventing the washing out of the gate and prevents the water from washing under the gate and thus seeping below the same.

In use of my invention, the gate is completely assembled and sold as a unit and is driven across the ditch and into the same at the desired point until the bottom wall of the tail piece rests firmly on the bed of the ditch. The gate proper 22 can now be raised or lowered to effectively control the flow of water through the gate opening and to the desired place.

Changes in details may be made without departing from the spirit or the scope of this invention, but:

What I claim as new is:

A headgate for irrigation ditches comprising an inverted U shaped angle iron frame, a sheet metal plate secured to one face of the frame, a reinforcing strap secured to and depending from the lower edge of the plate and connected to the terminals of the legs of said frame constituting an inserting cutting edge, the plate having a gate opening formed therein, vertical guides formed on the side walls of the gate opening, a gate proper slidably mounted in said guides, angle iron bars secured to the rear face of the plate and connected to the strap and to the top bar of the inverted U shaped angle iron frame, and a substantially U shaped tail piece connected to said bars, the tail piece including diverging side walls for engaging the banks of the ditch and a bottom wall for engaging the bed of the ditch, said walls having laterally extending attaching flanges, the side flanges being disposed between the angle iron bars and the plate and the bottom flange being secured to the front face of said plate and overlying the lower wall of the gate opening, the lower ends of the angle iron bars constituting inserting posts.

In testimony whereof I affix my signature.

ALPHONSO CRILL.